Sept. 1, 1970        J. I. PANKOVE        3,526,851
FILAMENTARY STRUCTURE INJECTION LASER HAVING A VERY NARROW
ACTIVE JUNCTION
Filed July 10, 1967
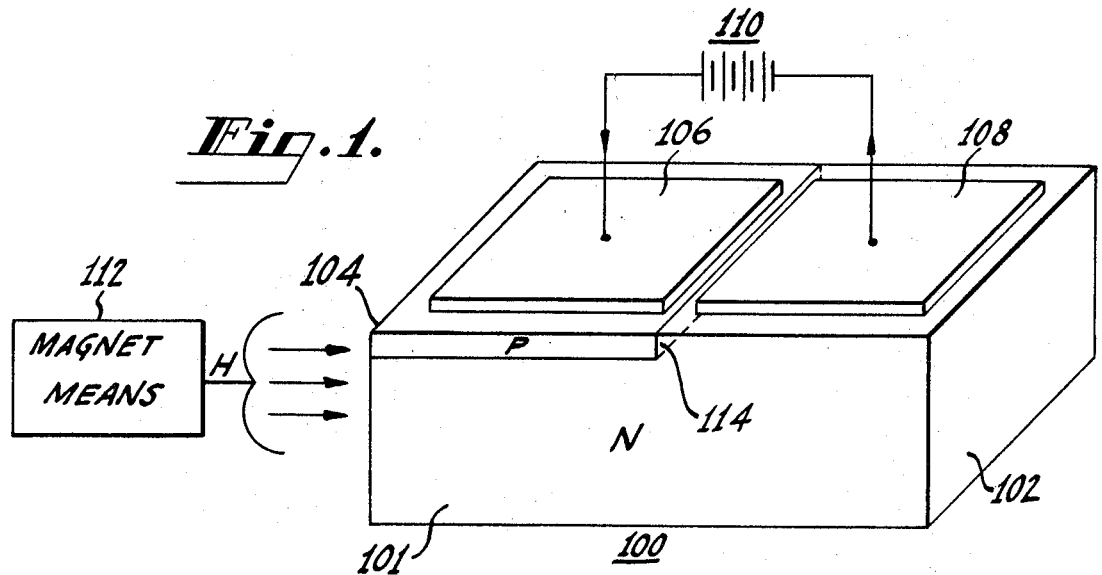
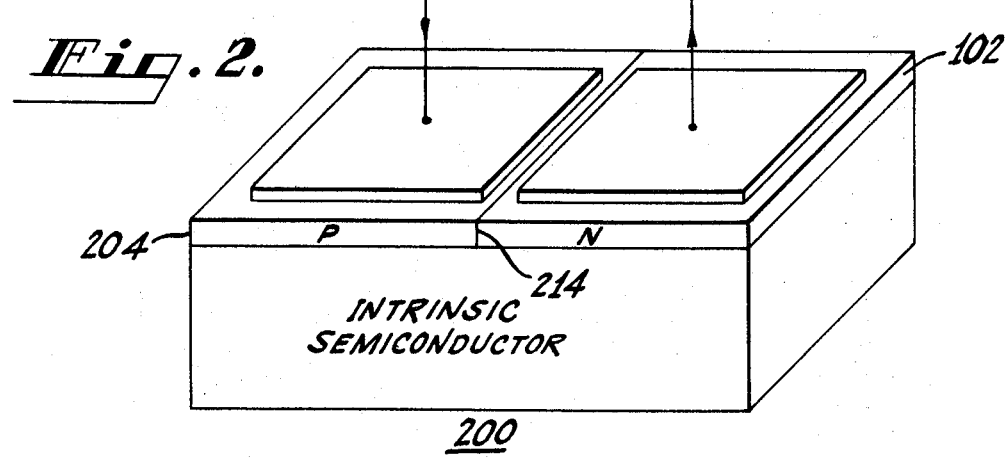
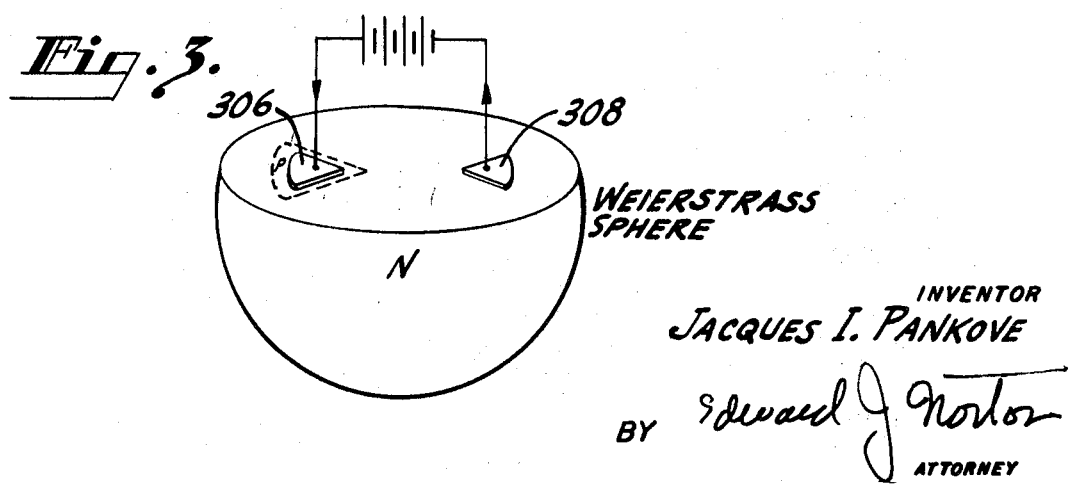
INVENTOR
JACQUES I. PANKOVE
BY Edward J. Norton
ATTORNEY United States Patent Office 3,526,851
Patented Sept. 1, 1970

3,526,851
FILAMENTARY STRUCTURE INJECTION LASER HAVING A VERY NARROW ACTIVE JUNCTION
Jacques I. Pankove, Princeton, N.J., assignor to RCA Corporation, a corporation of Delaware
Filed July 10, 1967, Ser. No. 652,301
Int. Cl. H01s 3/06
U.S. Cl. 331—94.5                               8 Claims

ABSTRACT OF THE DISCLOSURE

A highly efficient semiconductor injection laser diode operating over a narrower frequency band than is conventionally obtainable is achieved by constraining the current flow across the P-N junction of the diode to a given area having a width materially smaller than its length. This diode can operate continuously at ambient room temperature. At least one of the P-type or N-type regions of the diode is disposed in the form of a thin layer covering a portion of a single surface of the diode, while the remainder of the surface is composed of a region of opposite type conductivity to the aforesaid layer. Separate spaced electrodes are mounted on the given surface with one of the electrodes being in contact with solely the P-type region and the other of the electrodes being in contact with solely the N-type region. The electrodes are connectable across a source of voltage.

---

This invention relates to injection lasers and, more particularly, to an injection laser diode having a unique structure which permits a more efficient, room temperature, narrow band, CW, modulable injection laser to be achieved than was heretofore obtainable.

An injection laser diode, as known in the art, consists of a P-N junction diode composed of a semiconductor forming an optical resonant cavity and capable of producing light by stimulated emission when the current density across the P-N junction exceeds a critical value. An example of a semiconductor material which is useful as an injection laser diode is gallium arsenide.

The term "light" as used herein, includes not only visible light, but infrared and ultraviolet light as well.

Some of the advantages of injection lasers, as compared to other types of lasers, are that they may be made very small and inexpensive and, further, that they may be easily pumped by passing a forward current through the diode at a low voltage. However, a significant disadvantage of present-day injection lasers, as compared with other types of lasers, is that they emit light over a relatively broad frequency band. Thus, the spectral purity or monochromaticity of light obtainable from injection lasers is much less than that from other types of lasers. Further, a consequence of emitting light over a relatively broad frequency band is the lowering of the efficiency of operation of a semiconductor injection diode laser in the desired mode. Another disadvantage of present-day lasers is that the internal power dissipation prevents their continuous operation at room temperature, where they can be operated only with very short pulses of the order of 100 microseconds in duration.

It is an object of the present invention to provide a semiconductor injection diode laser which is capable of very much narrower band emission than was heretofore thought obtainable from such type lasers.

Another object of the present invention, is a semiconductor injection laser capable of operating continuously at room temperature.

These and other objects, features and advantages of the present invention will become more apparent from the following detailed description taken together with the accompanying drawing, in which:

FIG. 1 is a block diagram of a first embodiment of the present invention;

FIG. 2 is a block diagram of a second embodiment of the present inveniton; and

FIG. 3 is a block diagram of a third embodiment of the present invention.

Referring now to FIG. 1, there is shown in diagrammatic form a chip 100 of a lasing semiconductor material, such as gallium arsenide, GaAs, for instance, having the side surface 101 thereof and the opposite side surface thereof (not shown), which is parallel to surface 101, cleaved to form a resonant optical cavity. The bulk portion 102 of chip 100, as shown is composed of semiconductor material which has been doped to be of N-type conductivity. Chip 100 further includes a thin layer 104 of semiconductor doped to be of P-type conductivity. Layer 104 of P-type conductivity is located, as shown in FIG. 1, to form a portion of the top surface of chip 100. Bulk portion 102 of chip 100 is located, as shown, in contiguous relationship with layer 104 to form the remaining portion of the top surface of chip 100. The junction of P-type layer 104 and bulk portion 102 of N-type conductivity forms a P-N junction.

Mounted on the top surface of the chip 100, in contact solely with P-type layer 104, is first electrole 106. Also mounted on the top surface of chip 100, in contact solely with bulk portion 102 of N-type conductivity and in closely spaced relationship with first electrode 106 is second electrode 108. A source of voltage 110 is shown coupled across electrodes 106 and 108 for passing a forward current through the P-N junction diode formed by layer 104 and bulk portion 102 of chip 100.

Also diagrammatically shown in FIG. 1 is magnet means 112, which is not essential to the operation of the invention, but which, for reasons discussed below, may be beneficial. Magnet means 112 applies a magnetic field H, as indicated by the arrows, in a direction parallel to the plane of the top surface of chip 100 and perpendicular to the boundary on this top surface of chip 100 between P-type layer 104 and bulk portion 102 of N-type conductivity.

Although for illustrative purposes chip 100 in FIG. 1 is shown quite large in practice the dimensions thereof are tiny. For instance, the thickness of P-type layer 104 in a direction perpendicular to the top surface of chip 100 is normally in the range between 2–5 microns; the minimum spacing between electrodes 106 and 108 is normally in the range between 1 and 3 microns and the length of the boundary between P-type layer 104 and bulk 102 on the top surface of chip 100 is normally in the range between 100 and 400 microns. These quantities are provided solely by way of example. The important point, for reasons to be brought out below, is that the thickness of layer 104 in a direction perpendicular to the top surface of chip 100 is tiny relative to the length of the boundary of layer 104 and bulk 102 at the top surface of chip 100.

Considering now the operation of the device shown in FIG. 1, the presence of voltage source 110 will cause a forward current to flow through the P-N junction diode formed by chip 100. The relative current density distribution from point to point of the P-N junction of chip 100 will vary in a manner such that the highest current density will be produced over that edge area 114 of the P-N junction defined by the thickness of layer 104 and the length of the boundary between junction 104 and bulk 102 at the top surface of chip 100. This is because edge area 114 provides the shortest current paths and hence the paths of lowest resistance.

To further increase the current density through given area 114, magnet means 112 may be utilized. The magnetic field H produced by magnet means 112, as known in the art, will prevent charged carriers within chip 100 which have a velocity component in a direction perpendicular to the direction of magnetic field H from diverging by causing them to move in a helical path.

As is known in the injection laser art, lasing can only occur where the current density exceeds a predetermined threshold. The magnitude of the voltage from voltage source 110 is made such that this threshold is only exceeded where the current density is highest, namely, over edge area 114. Since the length of edge area 114 is so much greater than the width thereof, only a very few modes of optical oscillation can be supported. This results in coherent light emission of much narrower frequency band than was heretofore obtainable from an injection laser.

FIG. 2 shows a modification of the injection laser shown in FIG. 1 in which the bulk portion of the chip (chip 200) is made of intrinsic semiconductor material of high resistivity, and chip 200 is provided with both a P-type layer 204, similar to layer 104 of FIG. 1, and an N-type layer 202, oriented as shown on the top surface of chip 200.

In all other respects the embodiment shown in FIG. 2 is identical to that shown in FIG. 1. The advantage of the embodiment shown in FIG. 2 is that the high resistivity intrinsic semiconductor located below top layers 204 and 202 aids in further concentrating the current density through the given area 214 of the P-N junction while serving as an excellent mechanical support and as a means for dissipating the heat generated in the device.

FIG. 3 shows a third embodiment of the present invention, in which the chip is shaped in the form of a Weierstrass sphere of N-type conductivity having a P-type layer located therein, as shown. A first wedge shaped electrode 306 in contact solely with the top surface of the P-type layer has the apex thereof in close proximity to the apex of electrode 308 solely in contact with the top surface of the N-type material. This provides an arrangement for obtaining an extremely high current density in the tiny area between the respective apices of electrodes 306 and 308 thereby to provide a light source which can be confined nearly to a point.

A variety of semiconductor material is suitable for the application of the structures described in this invention; not only GaAs but also alloys of $GaAs_{1-x}P_x$, $Ga_{1-x}In_xAs$ and other materials wherein a large current density is desired.

What is claimed is:

1. In a structure for an injection laser comprising an integral semiconductor body including a given planar surface thereof, said planar surface of said body incorporating both a P-type region and an N-type region which are disposed in contiguous relationship to form a P-N junction therebetween having a boundary on said given surface, a first electrode mounted on said given surface and located on one side of said boundary in spaced relationship therewith, and a second electrode mounted on said given surface and located on the other side of said boundary in spaced relationship therewith, wherein at least one of said regions has a given thickness at said boundary in a direction normal to said given surface which is tiny relative to the length of said boundary, whereby a given area of said P-N junction is defined which has a length equal to the length of said boundary and a width equal to said given thickness, and wherein said P-type region, said N-type region and said first and second electrodes have such sizes, shapes and relative locations that in response to a given potential difference being applied across said first and second electrodes a predetermined current distribution exists through said body in which the current density exceeds the threshold at which coherent photons are generated only over said given area of said P-N junction, whereby said laser operates over a narrow optical frequency band.

2. The laser defined in claim 1, wherein the thickness of said entire body in a direction normal to said given surface is much larger than said given thickness.

3. The laser defined in claim 1, wherein said boundary has a length in the range between 100 and 400 microns, and said given thickness is between 2 and 5 microns.

4. The laser defined in claim 1, wherein the closest spacing between said first and second electrodes is at least one micron.

5. The laser defined in claim 4, wherein the closest spacing between said first and second electrodes is no greater than three microns.

6. The laser defined in claim 1, wherein said entire body with the exception of said one region is composed of the type semiconductor of said other region.

7. The laser defined in claim 1, wherein said entire body with the exception of both said one region and said other region is composed of high-resistivity semiconductor, and said other region has substantially said given thickness at said boundary in a direction normal to said given surface.

8. The laser defined in claim 1, further comprising means for applying a magnetic field in direction substantially perpendicular to said boundary and said given thickness.

References Cited

UNITED STATES PATENTS

| | | | |
|---|---|---|---|
| 3,229,104 | 1/1966 | Rutz. | |
| 3,245,002 | 4/1966 | Hall | 331—94.5 |
| 3,305,685 | 2/1967 | Wang | 250—199 |
| 3,354,406 | 11/1967 | Kiss | 331—94.5 |
| 3,363,195 | 1/1968 | Furnanage et al. | 331—94.5 |
| 3,431,513 | 3/1969 | Nannichi | 331—94.5 |
| 3,248,670 | 4/1966 | Dill et al. | 331—94.5 |

RONALD L. WIBERT, Primary Examiner

E. BAUER, Assistant Examiner